R. P. AKINS.
APPARATUS FOR DEWATERING AND CLASSIFYING ORES.
APPLICATION FILED SEPT. 14, 1909.

992,629.  Patented May 16, 1911.

2 SHEETS—SHEET 1.

WITNESSES:

INVENTOR.
R. P. AKINS.
BY
ATTORNEYS.

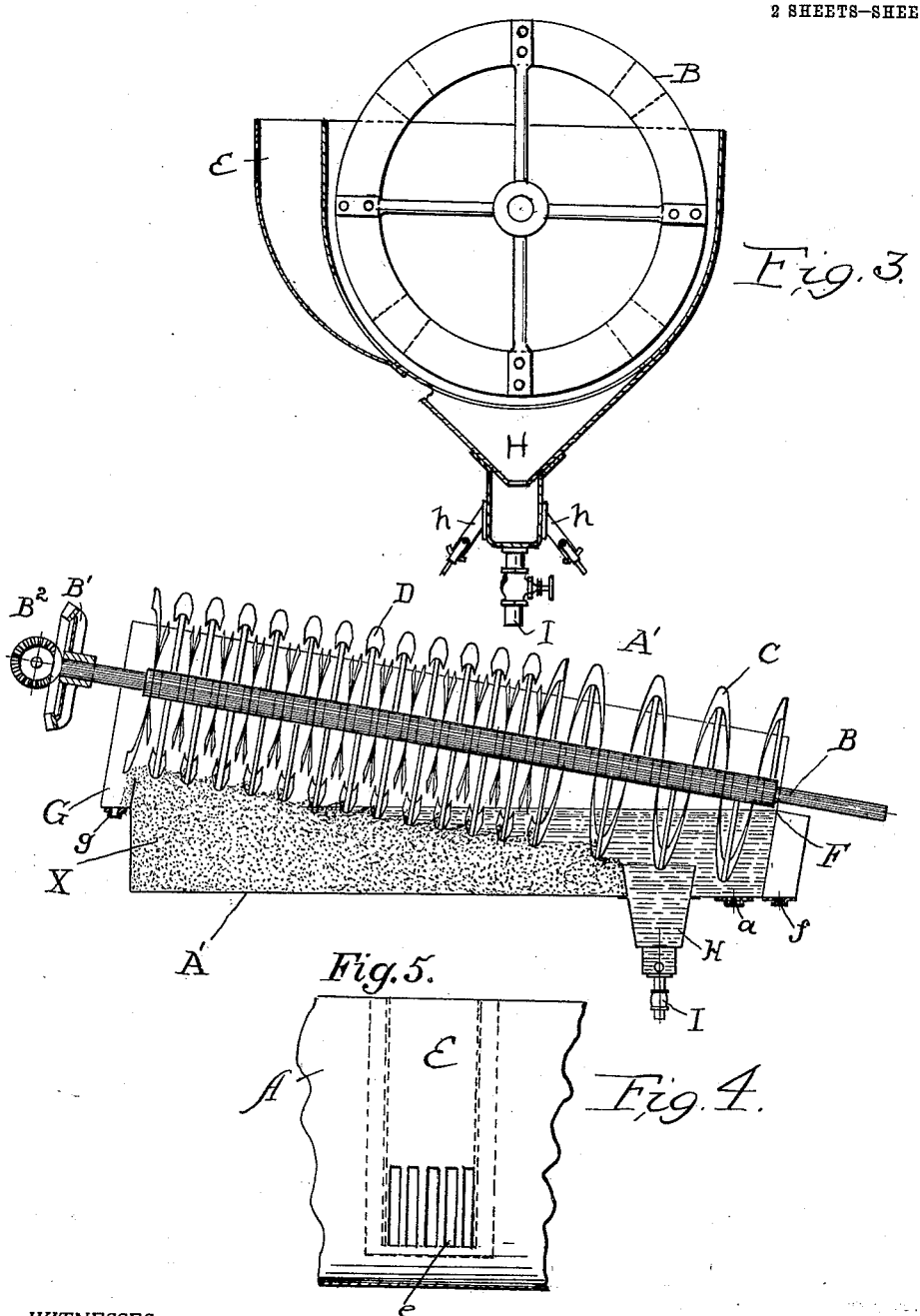

UNITED STATES PATENT OFFICE.

RANDALL P. AKINS, OF DENVER, COLORADO, ASSIGNOR TO COLORADO IRON WORKS CO., OF DENVER, COLORADO.

APPARATUS FOR DEWATERING AND CLASSIFYING ORES.

992,629. Specification of Letters Patent. Patented May 16, 1911.

Application filed September 14, 1909. Serial No. 517,713.

*To all whom it may concern:*

Be it known that I, RANDALL P. AKINS, citizen of the United States, residing at Denver, Colorado, have invented certain new and useful Improvements in Apparatus for Dewatering and Classifying Ores, of which the following is a specification.

My invention relates to an improved apparatus for dewatering and classifying ores, and comprises the novel features of construction and arrangement and combination of parts hereinafter described and particularly set forth in the appended claims.

An embodiment of my invention is illustrated in the accompanying drawings, in which—

Figure 1:
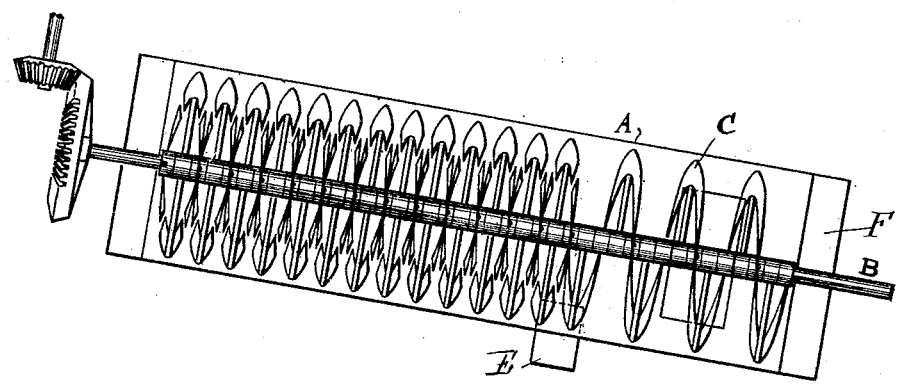
Figure 2:
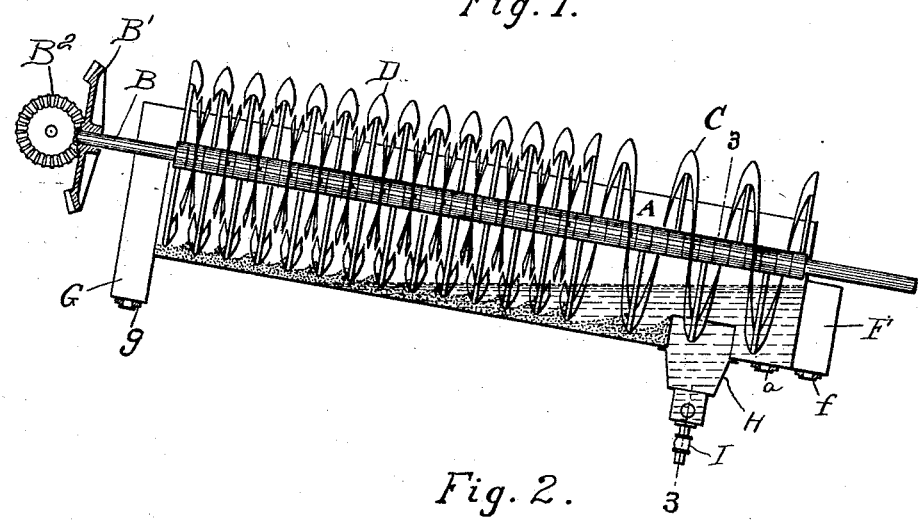

Figure 1 is a plan view; Fig. 2 is a longitudinal vertical section; Fig. 3 is a transverse section on line 3—3 of Fig. 2; and Fig. 4 is a detail, and Fig. 5 is a view of a modification.

Referring by reference characters to this drawing, the letter A designates a stationary tank or trough, approximately semi-circular in cross section, and designed to be supported, in practice, in any suitable manner so that its bottom will be inclined from the horizontal, as shown. Journaled within this tank is a rotary shaft B designed to be driven by any suitable means, of which the gearing $B^1$ $B^2$ is illustrative. This rotary shaft carries, for a portion of its length, a spiral conveyer consisting of a continuous spiral flight or flights, as indicated at C, the continuous conveyer being located in that portion of the trough which is lowermost so as to be partially submerged in the liquid contained therein. Succeeding the continuous spiral and lying in the more elevated portion of the trough is a section of interrupted spirally located flights or rabbles D, which, for convenience, I mount on the same shaft as the continuous spiral, as by this arrangement both may be operated from the same shaft and operating mechanism. These spiral flights leave rabbles or blades which are staggered along the shaft of the conveyer with relation to each other as shown in Figs. 1, 2 and 5, so that they not only serve to convey the material toward the more elevated portion, but thoroughly agitate it as each succeeding blade tends to have a plowing effect upon the material left by the preceding blade while the liquid can drain freely back through and between the blades or interrupted spirals.

At the side of the trough is located the feed opening which extends downward and communicating with said trough at point *e* which is below the liquid level within the trough, so that the material feed is completely submerged before entering into the trough, thus making a submerged feed opening at the side of the trough. At the lower end is located an overflow receptacle F into which the slime and lighter particles overflow, and from which they may be conveyed in any suitable manner to a receiving tank for further treatment. At the upper end is located a sand receiving hopper G. The trough, at its lower part, is provided with an intermediate settling compartment H into which any coarser particles flowing toward the slime overflow F may settle, and out of which they may be drawn as a separate product by the gated discharges *h*. A valved water supply pipe I communicates with the bottom of this settling compartment by which an upward flow of liquid may be caused in the compartment, and by which the coarser particles which have settled therein may be washed and freed from any clay or slimy material, such material rising, by force of the incoming liquid, and overflowing into the collecting chamber F. Gated openings are provided in the bottom of the compartments F and G, and at the lower end of the trough, as indicated at *f*, *a* and *g*.

In the operation of the device the continuous and interrupted spirals are set in rotation, and the pulp having been properly treated, is fed into the compartment E, whence it passes through the openings *e* into the bottom of the trough. The rotation of the continuous spiral agitates the pulp and causes the lighter particles of ore or slimes to be retained in suspension, the coarser particles settling through the liquid. The interrupted spiral flights or rabbles cause the heavier particles of ore which have settled to the bottom of the tank and been conveyed to the end of the continuous spiral, to be carried on up to the sand delivery end, where they are delivered into the sand discharge hopper, the water and lighter particles draining back through the interrupted spirals.

In Fig. 5 I have shown another method of applying the rotary shaft carrying the continuous and interrupted spiral conveyer flights, as already described, in a trough of suitable section provided with a horizontal bottom. The shaft "B", with its various attachments, as already described is journaled, so as to revolve in the tank or trough "A'" at a suitable inclination and speed. This trough "A'" may be made of any suitable material, and of similar section as trough "A", but is made with horizontal bottom instead of inclined. In the operation in this tank, the sands and coarser particles fill the space "X" under the spirals and form a porous filter bed in this section of the tank, so that when separating the sands from the slime, the liquid carried by these coarser sands will filter down through this filter bed and seek the level of the overflow at "F", thus assisting the interrupted spirals in the dewatering of the sand or coarser particles, and make of the whole, in some cases, a more suitable arrangement of the inclined continuous and interrupted spirals. In this construction, the material which accumulates, as shown, practically forms an inclined bottom up which the ore is caused to travel by the spirals, but being porous, permits the draining back as described.

Having thus described my invention what I claim is:—

1. An apparatus for classifying ores comprising a trough having a discharge at one end for the slimes, a discharge at the opposite end for the sands or coarser material, and an inclined agitating and separating conveyer having one end partially submerged and provided with a continuous spiral at the submerged end, the opposite end having an interrupted spiral forming rabbles or blades staggered with relation to each other along the conveyer shaft adapted to convey, plow and turn the material being conveyed to the upper discharge end.

2. An apparatus for classifying ores comprising a trough having a discharge at one end for the slimes, a discharge at the opposite end for the sands or coarser material, and an inclined agitating and separating conveyer having one end partially submerged and provided with a continuous spiral at the submerged end, the opposite end having an interrupted double spiral forming rabbles or blades staggered in relation to each other along the conveyer shaft adapted to convey, plow and turn the material being conveyed to the upper discharge end.

3. In an apparatus for classifying ores, the combination with a single trough having a discharge at one end for the slimes and a discharge at the opposite end for the sands or coarser material, of an inclined agitating and separating conveyer rotatably mounted therein and having one end partially submerged, said conveyer comprising a single shaft carrying a continuous spiral at the submerged portion and an interrupted spiral forming rabbles or blades staggered with relation to each other along the conveyer shaft for the remaining portion of said trough adapted to plow and turn the material being conveyed to the upper discharge end.

In testimony whereof, I affix my signature in presence of two witnesses.

RANDALL P. AKINS.

Witnesses:
  W. R. CADY,
  JOHN E. ROTHWELL.

---

Copies of this patent may be obtained for five cents each, by addressing the "Commissioner of Patents, Washington, D. C."